US012798815B2

(12) United States Patent
Bierlein et al.

(10) Patent No.: US 12,798,815 B2
(45) Date of Patent: Nov. 17, 2026

(54) HEAT TREATING A FOOD PRODUCT CONTAINED IN A PACKAGE

(71) Applicant: Tetra Laval Holdings & Finance S.A., Pully (CH)

(72) Inventors: Pär Bierlein, Dalby (SE); Andreas Eriksson, Löddeköpinge (SE); Johan Olsson, Gards Köpinge (SE); Magnus Jonsson, Bjärred (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/548,992

(22) PCT Filed: Mar. 11, 2022

(86) PCT No.: PCT/EP2022/056359
§ 371 (c)(1),
(2) Date: Sep. 5, 2023

(87) PCT Pub. No.: WO2022/189643
PCT Pub. Date: Sep. 15, 2022

(65) Prior Publication Data
US 2024/0150057 A1 May 9, 2024

(30) Foreign Application Priority Data
Mar. 11, 2021 (EP) .................................... 21162166

(51) Int. Cl.
*B65B 55/02* (2006.01)
*A23B 2/00* (2025.01)
(Continued)

(52) U.S. Cl.
CPC .............. *B65B 55/02* (2013.01); *A23B 2/001* (2025.01); *A23B 2/22* (2025.01); *B65B 2220/24* (2013.01)

(58) Field of Classification Search
CPC ....... B65B 55/14; B65B 55/18; B65B 55/025; B65B 55/027; B65B 55/04; B65B 55/06; B65B 2220/24
(Continued)

(56) References Cited

U.S. PATENT DOCUMENTS 5,609,819 A * 3/1997 Shimizu .................... A61L 2/12 53/425
7,784,248 B2 * 8/2010 Andersson .............. B65B 55/12 53/425
(Continued)

FOREIGN PATENT DOCUMENTS

EP 0342831 A2 11/1989
JP 2007126177 A * 5/2007
(Continued)

OTHER PUBLICATIONS

International Search Report mailed Apr. 29, 2022, for priority International Application No. PCT/EP2022/056359.

*Primary Examiner* — Shelley M Self
*Assistant Examiner* — Patrick B Fry
(74) *Attorney, Agent, or Firm* — Renner, Otto, Boisselle & Sklar, LLP

(57) ABSTRACT

A method is provided for heat treating a food product contained in a package. The package is made of a packaging material comprising a carton layer. The method comprises exposing the package to hot water to thereby transfer heat from the hot water to the food product, drying the package, such that a water content in the carton layer of the packaging material is reduced, and exposing the package to cold water to thereby transfer heat from the food product to the cold water.

16 Claims, 5 Drawing Sheets

(51) Int. Cl.
*A23B 2/22* (2025.01)
*B65B 55/18* (2006.01)

(58) Field of Classification Search
USPC ...... 53/440, 425, 127, 426, 428; 422/26, 38; 426/392, 393, 407
See application file for complete search history.

(56) References Cited

U.S. PATENT DOCUMENTS

| | | | | |
|---|---|---|---|---|
| 9,027,311 | B2 * | 5/2015 | Kemp ..................... | B65B 5/045 53/425 |
| 11,377,247 | B2 * | 7/2022 | Uetsuki ................. | B65B 53/063 |
| 2012/0047850 | A1 | 3/2012 | Kemp et al. | |
| 2017/0197744 | A1 * | 7/2017 | Larroche ............... | B65B 31/028 |
| 2022/0008590 | A1 * | 1/2022 | Schweizer ................ | A61L 2/07 |
| 2022/0354635 | A1 * | 11/2022 | Dockhorn ............... | B65B 55/18 |

FOREIGN PATENT DOCUMENTS

| | | | |
|---|---|---|---|
| KR | 200384632 | Y1 | 5/2005 |
| WO | 2006/112765 | A2 | 10/2006 |
| WO | 2016/170827 | A1 | 10/2016 |

* cited by examiner

*Fig. 4*
400
EXPOSING TO HOT WATER
402
DRYING FOOD PACKAGE
404
EXPOSING TO COLD WATER
406

HEAT TREATING A FOOD PRODUCT CONTAINED IN A PACKAGE

TECHNICAL FIELD

The invention relates to food processing. More particularly, it is related to heat treating a food product while contained in a package that comprises carton.

BACKGROUND ART

During the 1990s, technology was developed that allowed food products, such as beans and crushed tomatoes, to be heat treated while held in carton packages. For instance, at this time, Tetra Pak® launched the Tetra Recart® package in which the food products first are filled in the carton packages, and thereafter fed into e.g. a retort station in which the food products as well as the packages are heat treated. By making it possible to use carton packages, instead of tin cans, the same shelf life could be achieved but with significantly lowered environmental impact by using more sustainable package materials.

Even though retorting is commonly used for beans, peas, etc., some food products, such as tomatoes, can also be handled by using so-called hot fill. When using hot fill, as the name suggests, the food product is heated and filled, while heated, into the packages. The heat of the food product in combination with the properties of the food products, e.g. acidity levels of the food products, provides for that bacteria, spores and other unwanted microorganisms are killed off.

Exposing food packages, and the food product held therein, to heat comes with the positive effect that the food product becomes safe to consume. However, the heat exposure has a negative impact on the packaging material. For instance, printed décor on the packaging material may suffer during the heat exposure, in particular if the heat is provided by using steam.

A common solution to the problem of how to reduce the impact on the packaging material by the heat exposure can be learned from the tin can industry. To avoid that the printing is negatively affected during the heat treatment, the packages are heat treated without printing, e.g. a clean tin can, and after the heat treatment the packages are labeled. By applying the labels, i.e. the printed packaging material, after the heat treatment, the risk is avoided.

In carton-based packages made to withstand the heat treatment, it is known to have a plastic layer outside a carton layer. In this way, the carton layer, which can comprise the printing, can be protected from steam or any other heat transfer medium by the plastic layer.

Even though there are different technologies available today, there is a problem still that the packaging material can be damaged when carton-based packages filled with food products are heat treated, in particular when steam is used for supplying the heat.

SUMMARY

It is an object of the invention to at least partly overcome one or more of the above-identified limitations of the prior art. In particular, it is an object to provide a method for assuring that the food product is adequately heat treated at the same time as the integrity of the packaging material is maintained.

According to a first aspect a method for heat treating a food product contained in a package is provided. The package may be made of a packaging material comprising a carton layer. The method may comprise exposing the package to hot water to thereby transfer heat from the hot water to the food product, drying the package, such that a water content in the carton layer of the packaging material is reduced, and exposing the package to cold water to thereby transfer heat from the food product to the cold water.

By including the step of drying the package, water that may have penetrated into for example the carton layer via exposed ends of the packages or through a protective layer can be removed before the package again is exposed to water, in the form of the cold water. Removing the water in this way can be seen as allowing the package to recover between the step of being exposed to the hot water and the step of being exposed to the cold water. As an effect of this recovering, the package is less affected during the heat treatment, which can result in that package integrity can be maintained during longer periods of exposure to the hot water and/or the cold water and that the printed décor is kept in good condition.

The package may be exposed to the hot water until a temperature of the food product is in the range of 90 to 130° C. The package may be exposed to the hot water for 15 to 80 minutes. The exposing of the package to hot water may comprise holding the package in a chamber having a relative humidity in the range of 80 to 100%.

The drying may comprise holding the package in a chamber having a mean temperate over time in the range of 10 to 75° C. The drying may be performed for at least 1 minute, or for at least minutes. The drying may be performed for up to 30 minutes. The drying may comprise holding the package in a chamber having an absolute humidity that is less than half of the absolute humidity of the chamber when the package is exposed to the hot water. The drying may comprise holding the package in a relative humidity that is less than 30%. The drying may comprise holding the package in a relative humidity that is less than 50% or the relative humidity of the chamber when the package is exposed to hot water.

The package may be exposed to the cold water until a temperature of the food product is gradually reduced to less than 50° C. More particularly, less than 45° C. for a retort station, and less than 12° C. for a pasteurizer. The food product may be exposed to the cold water for 20 to 90 minutes. The exposing of the package to cold water may comprise holding the package in a relative humidity in the range of 80 to 100%.

The step of drying may comprise generating an air flow in a chamber holding the package, to provide for that steam is removed from said chamber such that humidity in said chamber is reduced. The step of drying may comprise condensing water from air in a chamber holding the package, to provide for reduced humidity in said chamber.

According to a second aspect it is provided an apparatus for heat treating a food product contained in a package, the package being made of a packaging material comprising a carton layer, said apparatus comprising a chamber arranged to hold the food package, a nozzle arrangement arranged to provide hot water inside the chamber for exposing the package to hot water and thereby transfer heat from the hot water to the food product, and provide cold water inside the chamber for exposing the package to cold water to thereby transfer heat from the food product to the cold water, and an air circulation system for circulating air in the chamber and comprising a condenser for reducing the humidity of the air and thereby provide for drying the package when located inside the chamber, such that a water content in the carton layer of the packaging material is reduced.

According to a third aspect it is provided a system for heat treating a food product contained in a package, the package being made of a packaging material comprising a carton layer, said system comprising, in sequential order a heating station provided with a chamber arranged to expose the package to hot water to thereby transfer heat from the hot water to the food product, a drying station arranged to dry the package, such that a water content in the carton layer of the packaging material is reduced, and a cooling station provided with a chamber arranged to expose the package to cold water to thereby transfer heat from the food product to the cold water.

According to a fourth aspect it is provided a food product contained in a food package obtained by a method according to the first aspect.

The apparatus and the system each have the same advantages as the method, and may include the same embodiments and features as the method.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
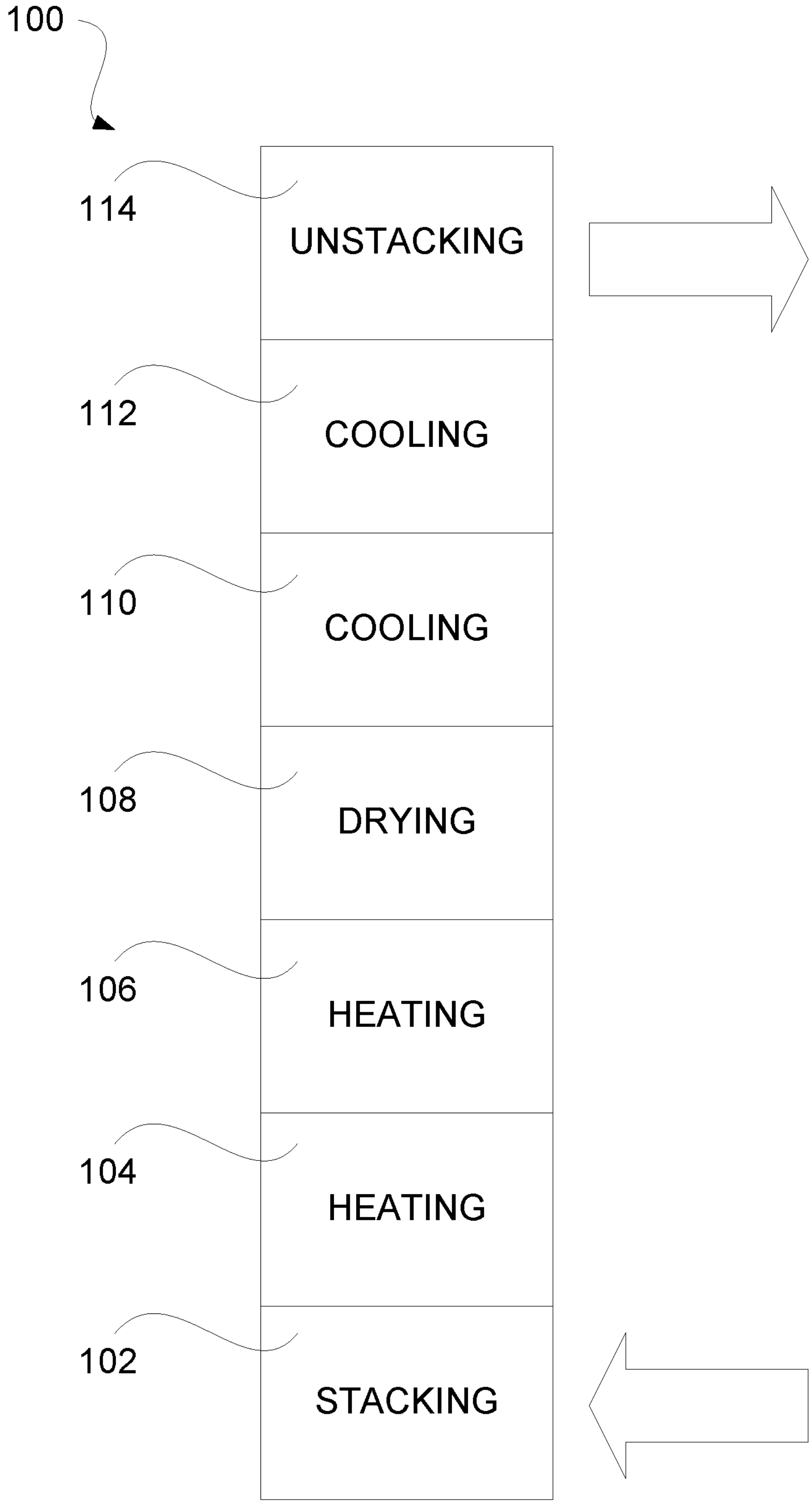
FIG. 1 is a flow chart of a process for heat treating food product contained in packages.

FIG. 1 is a flow chart 100 illustrating a process for heat treating food product contained in packages. In a first step 102, the packages are stacked on a carrier device or other device arranged for transporting the packages into a retorting station or other apparatus for heat treating the food products and the packages holding the food products. In a second step 104, when placed in the retorting device, the packages are heated to a first temperature. Next, in a third step 106, the packages are further heated to a second temperature, which is typically higher than the first temperature. Both the second and third step 104, 106 may comprise spraying hot water onto the packages. The hot water may have a liquid form or a from that is more or less gaseous (steam). During the second and third step 104, 106, heat is transferred into the food products such that these are heated and microorganisms are killed off. Even though two steps of heating is described, this is only to be seen as an example. Further, how to heat treat the food products, that is, how many steps, duration of the different steps, temperatures, etc., is not only a matter of food safety, but also has an effect of the taste and properties of the food products. Thus, different food producers may choose different combinations of heating steps.

Once the food products and the packages are heated, in a fourth step 108, the packages are dried. As will be further elaborated upon below, this may include that a humidity level inside the retorting station is lowered by using an air circulation system. An advantage of having the step of drying is that negative effects on packaging material can be reduced.

The drying 108 can be performed at atmospheric conditions and at a temperature of about 23° C. The drying can be performed at a temperature that is lower than this, such as below 20° C., below, 17° C. or below 14° C. In each case the temperature should still be above 0° C., preferably above 5° C. Drying at a cooler temperature may be advantageous in that the moisture content of surrounding air can then be lower, causing more dry air to replace water that evaporates from the carton layer in the package. This results in more efficient drying of the package. When using a cooler temperature it can be said that the drying also includes “cooling”, as it cools the carton layer. Of course, warm air can also be used for the drying but then it should preferably be assured that the water content of the surrounding air is not too high.

Thereafter, in a fifth step 110, the packages are cooled down. This may be made by spraying cold water onto the packages. As for the steps of heating the packages, i.e. the second and third steps 104, 106, the cooling may be divided in two steps, and thus after the fifth step 110, a sixth step 112 may follow in which the packages are further cooled down. The cold water used in the fifth and sixth steps 110, 112 may be of different temperatures in the two steps. Further, duration and amount of water used may differ between the two steps.

In a seventh step 114, the packages may be unstacked. This may involve opening the retorting station, taking out the carrier device from the retorting station and moving the packages from the carrier device onto a conveyor band or other downstream equipment for further processing.

Figure 2A:
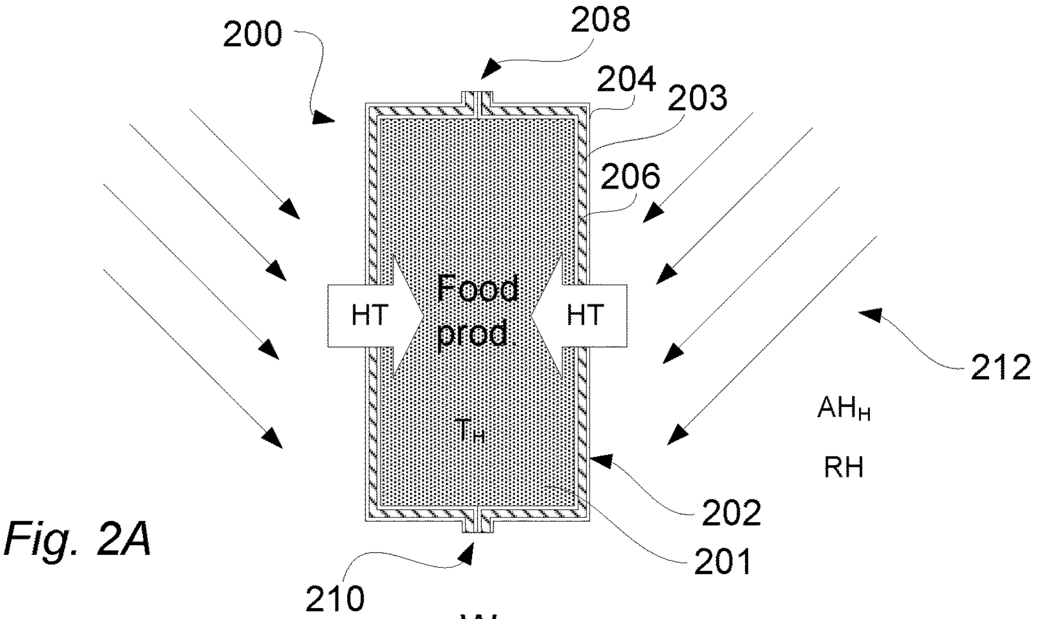
FIG. 2A-C illustrate a package containing a food product, when heat treated, dried and cooled.
Figure 2B:
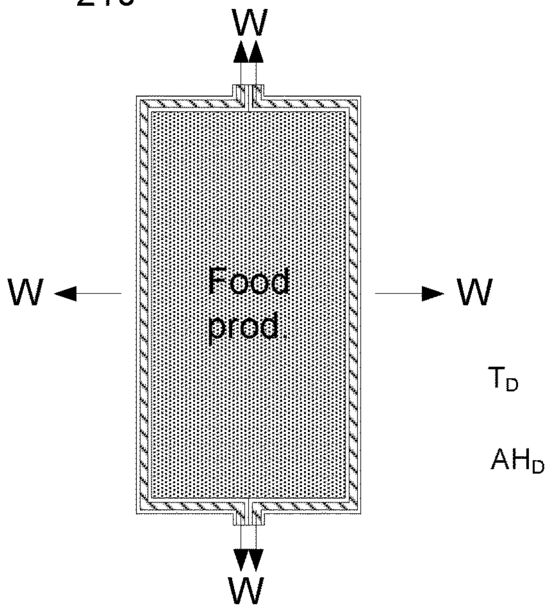
Figure 2C:
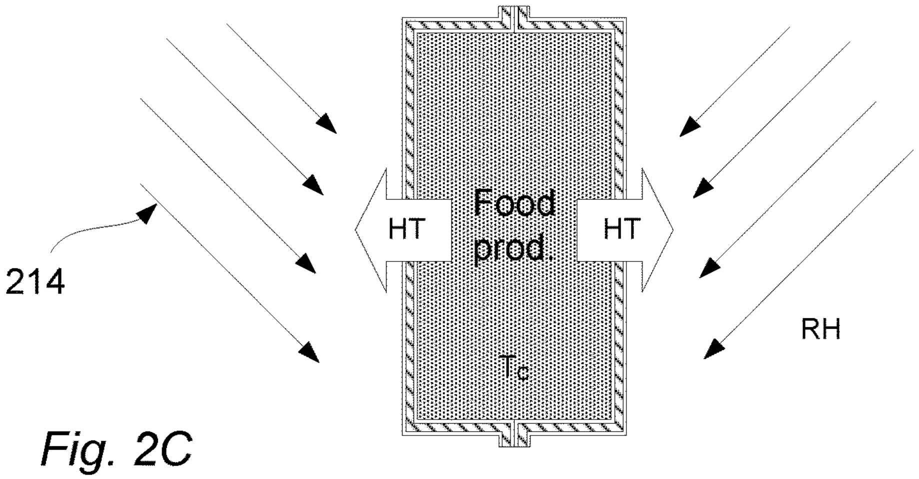

FIG. 2A to 2C illustrate by way of example a package 200 during heating, e.g. the second or third step 104, 106 illustrated in FIG. 1, during drying of the package 200, e.g. the fourth step 108, and during cooling of the package 200, i.e. the fifth or sixth step 110, 112, respectively.

Starting with FIG. 2A, the package 200 comprises a food product 201. The package 200 may be formed by a packaging material 202 comprising a carton layer 203, an outer plastic layer 204 and an inner plastic layer 206. The carton layer 203 provide rigidness for the package. The carton layer may be a cardboard layer. The carton layer may be a fibre-based layer made primarily of cellulose. The outer plastic layer 204 protects the carton layer 203 against e.g. moisture from a surrounding environment, while the inner plastic layer 206 can protect the carton layer 203 from the food product 201.

When producing the package 200, a longitudinal sealing can be provided on a blank such that a sleeve is formed. The sleeve may be closed in one end by a first transversal sealing, such that a bottom or top is formed, filled with the food product 201 and thereafter closed in the other end by a second transversal sealing, such that both the bottom and the top are provided. Since the package 200 is formed from a blank cut from a web of packaging material, the carton layer 203 can be exposed in a top fin 208 and a bottom fin 210 of the package 200, i.e. there is no plastic layer present to cover the carton layer at the edges.

During heating, heat HT can be transferred into the food product 201 via the package 200. As indicated above, the heat HT may be provided by using hot water 212 as a heat transfer medium. The exposure of hot water 212 can continue up until a temperature TH of the food product is in the range of 90 to 130° C. The package 200 may be exposed to hot water 15 to 80 minutes. As an alternative to spraying the hot water 212 onto the package 200, the package 200 may be exposed to hot water 212 by holding the package 200 in a relative humidity RH in the range of 80 to 100%. When the package 200 is exposed to hot water and thereby heated, a small amount of the water may occasionally pass through the outer plastic layer 204 and enter the carton layer 203.

During drying, as illustrated in FIG. 2B, water W can be transferred away from the packaging material 202. As illustrated, the water W may be transferred from the packaging material via the top fin 208 and the bottom fin 210, but also from the carton layer through the outer plastic layer 204. Such transfer through the outer plastic layer 204 depends on what type of plastic the layer 204 is made of, and happens usually only when the outer plastic layer 204 is warm.

The drying may comprise holding the package 200 in a mean temperate TD over time in the range of 10 to 75° C. The drying may be performed for at least 1 minute or at least 3 minutes. The drying may be performed up to 30 minutes. Further, the drying may comprise holding the package 200 in an absolute humidity $AH_D$ that is less than half of the absolute humidity $AH_H$ when the package 200 is exposed to the hot water 212. The drying may also or alternatively comprise holding the package in a relative humidity RH that is less than 30%. Further, the drying may comprise holding the package 200 in a relative humidity RH that is less than 50% of the relative humidity RH when the package 200 is exposed to hot water 212, wherein relative humidity is to be understood as absolute humidity relative to maximum humidity given the same temperature.

The cooling of the package 200, illustrated in FIG. 2C, can be achieved by spraying cold water 214 onto the package 200. Due to the temperature difference, the heat HT may be transferred from the food product 201 inside the package 200 to a surrounding environment. The package may be exposed to the cold water 214 until a temperature Tc of the food product 201 is gradually reduced to less than 50° C. More particularly, if the retorting station is used below 45° C., and in case a pasteurizer is used below 12° C. The food product 201 may be exposed to the cold water 214 for 20 to 90 minutes. Exposing of the package 200 to the cold water 214 may comprise holding the package 200 in a relative humidity RH in the range of 80 to 100%.

Figure 3A:
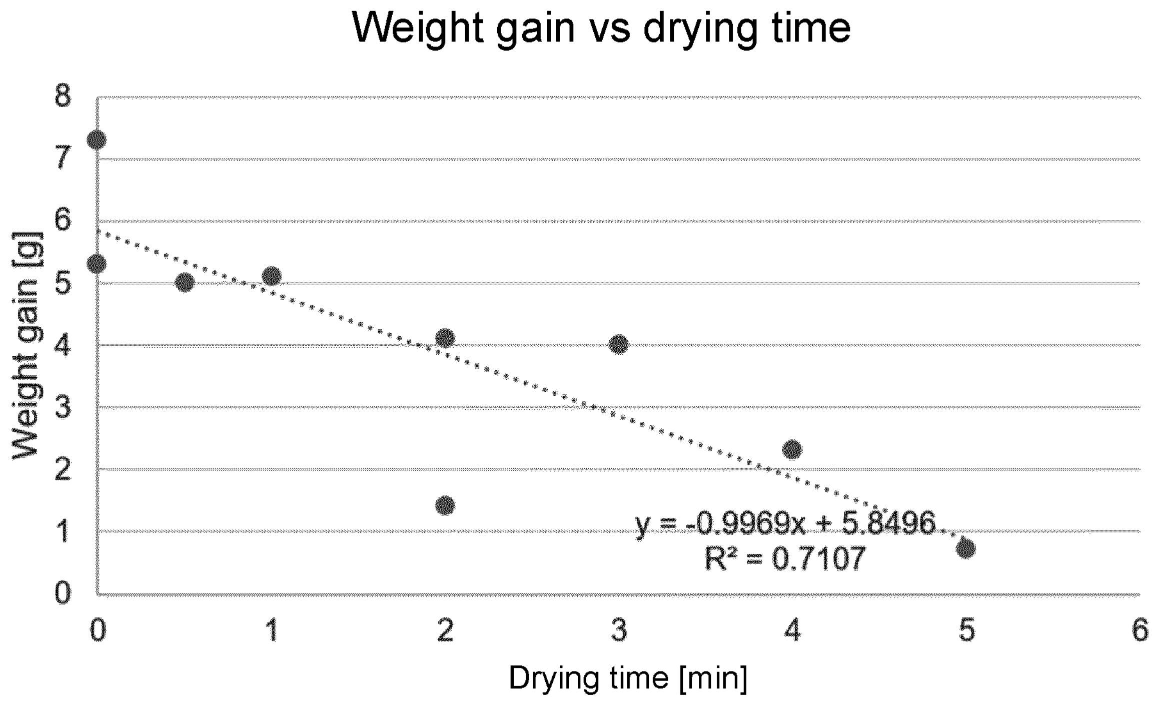
FIG. 3A and FIG. 3B are diagrams illustrating weight gain respectively edge wicking for packages, caused by absorbed water, as a function of time.

FIG. 3A is a graph illustrating test results obtained when using a drying step in the process for heat treating food product contained in packages as described herein. The packages were of the type like the package 200 described above, being made of a packaging material that comprises a carton layer, an outer plastic layer and an inner plastic layer. The thickness of the carton layer was 294 μm. The outer plastic layer had a thickness of 31 μm. The inner plastic layer was made of two plastic layers of different plastic materials which had a combined thickness of 64 μm. The size (volume) of the package was 390 ml and both the carton layer and plastic layers were made of materials conventionally used for packages within the technical field of heat treating food product contained in packages. Specifically, the packages were 390 ml Tetra Recart® packages of the midi format.

The drying was performed at atmospheric pressure, at a room temperature of about 22° C. and at a relative humidity of 50%. On the x-axis in the graph the drying time in minutes is shown. On the y-axis the amount of water in the carton layer, measured in gram, is shown. The amount of water in the carton layer was determined by comparing the weight of the package with the weight it had before being filled with food product and used in the process for heat treating food product contained in packages as described herein.

Figure 3B:
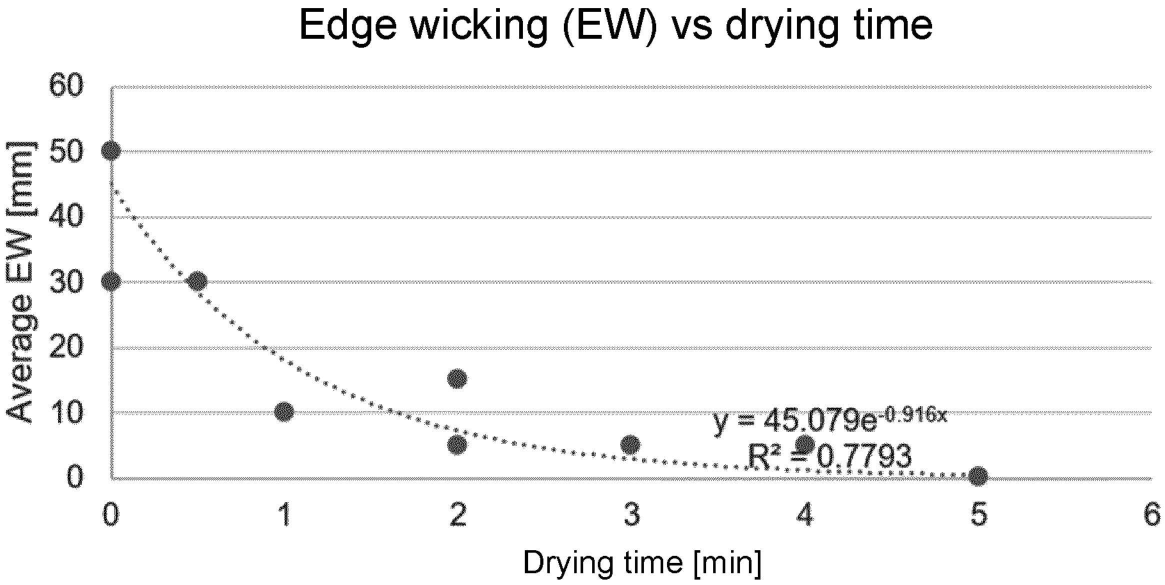

FIG. 3B is a graph illustrating the test results obtained for the same packages but instead showing, on the y-axis, the edge wicking (EW) in mm. Edge wicking is the distance from the top sealing (open carton edge) into the carton layer where it can be observed that the carton layer has absorbed water. For example, 10 mm edge wicking means that water has penetrated 10 mm into the carton layer, as seen along the planar direction of the carton layer and as measured from the edge of the carton layer. The edge of the carton layer coincides with the edge of the packaging material. Wicking was determined by studying the package from the outside, as it can be clearly seen when a carton layer is affected by water or other liquid (it becomes darker). Several points were studied for each package and the average value was calculated.

It could be seen that the weight gain, or water absorption is gram, decreases relatively linearly with time, following a curve described as $y=-0.9969x+5.8496$, where y is the amount of water in gram and x is the drying time in minutes.

It could also be seen that the edge wetting decreased more exponentially, following a curve described as $y=45.079e^{-0.916x}$ where y is the edge wetting in mm and x is drying time in minutes.

As can be seen from FIG. 3A and FIG. 3B, edge wetting decreased significantly faster and after only 1 minute it was generally below 10 mm. This was a positive surprise since it is primarily edge wetting that causes so called "soggy packages", i.e. packages where the carton layer becomes so wet that it loses it rigidity and thus the ability to support and maintain the shape of the package.

Describing FIG. 3A in other words, in can be said it illustrates weight gain of a type of package like the package 200 previously described, after having been subjected to heat treatment and thereafter cooled from time 0 to 5 minutes. During cooling the package was in a dry, indoor atmosphere. As can be seen from the graph, in this particular experiment, after approximately 5 minutes only a minor weight gain can be measured, i.e. the weight gain initially measured was over time reduced. Thus, for this particular package used in this experiment, drying for 5 minutes provides for that most water transferred into the packaging material during the heating step, in which the package is subjected to water, has been dried out from the package 200.

It was observed that among packages with a higher water content in the packaging material, more of these were often considered soft or soggy, not having the desired stiffness compared to packages that have a lower water content in the packaging material. By including a drying step when heat treating the food product 201, contained in the package 200, damages on the package 200 can be avoided or at least reduced.

Figure 4:
FIG. 4 is a flowchart illustrating a method for heat treating a food product contained in a package.

FIG. 4 is a flowchart illustrating a general method 400 for heat treating the food product 201. In a first step 402, the package 200 is exposed to the hot water 212 to thereby transfer heat HT from the hot water 212 to the food product 201. In a second step 404, the package 200 can be dried such that a water content in the carton layer 203 of the packaging material 202 is reduced. In a third step 406, the package 200 can be exposed to cold water 214 to thereby transfer heat HT from the food product 201 to the cold water 214.

The drying 404 can be performed at atmospheric conditions and at a temperature of about 23° C. The drying can be performed at a temperature that is lower than this, such as below 20° C., below, 17° C. or below 14° C. In each case the temperature should still be above 0° C., preferably above 5° C. Drying at a cooler temperature may be advantageous in that the moisture content of surrounding air can then be lower, causing more dry air to replace water that evaporates from the carton layer in the package. This results in more efficient drying of the package. When using a cooler temperature it can be said that the drying also includes "cooling", as it cools the carton layer. Of course, warm air can also be used for the drying but then it should preferably be assured that the water content of the surrounding air is not too high.

Figure 5:
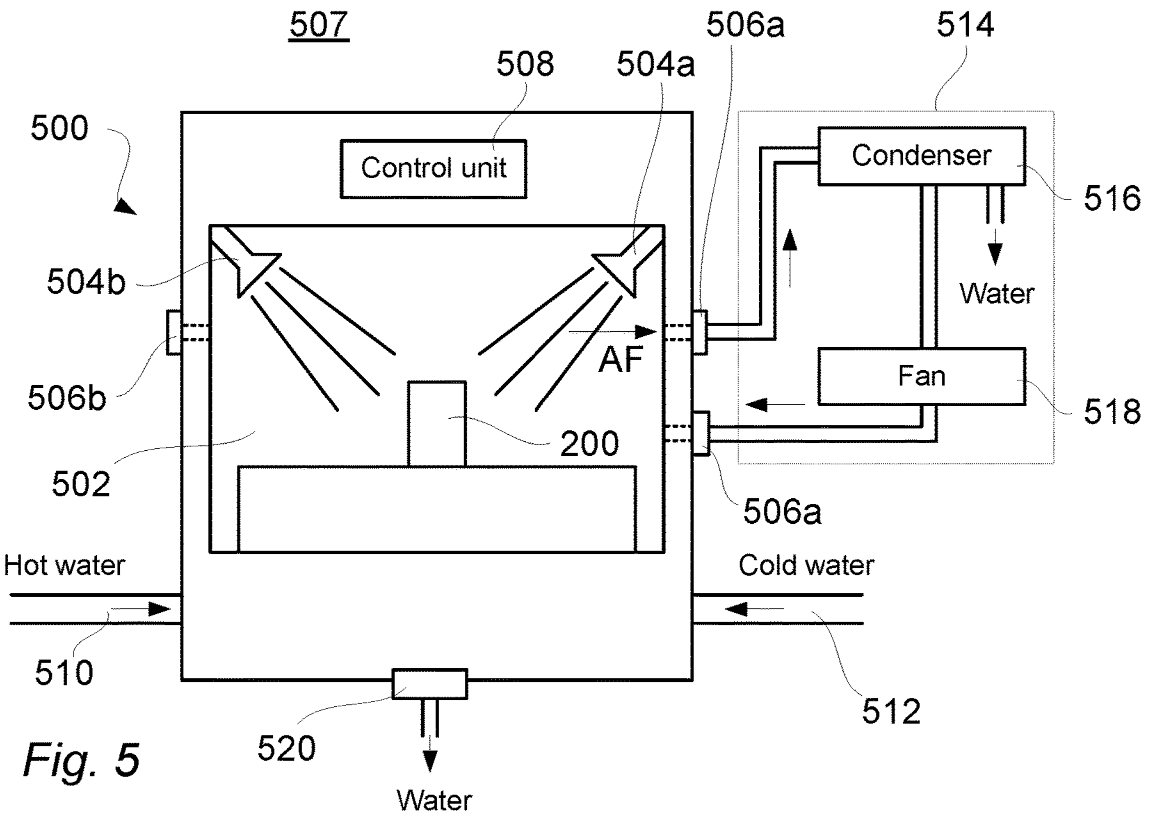
FIG. 5 illustrates an apparatus for batchwise heat treating of food product in packages.

FIG. 5 illustrates an apparatus 500 for batchwise heat treatment of the packages 200 containing the food product 201 by way of example. The apparatus 500 may be a retorting station.

The apparatus 500 can comprise a chamber 502 for holding the package 200. Even though not illustrated, a door may be provided for accessing the chamber 502. To provide the hot water 212 and the cold water 214, nozzles 504*a*, 504*b* can be provided inside the chamber 502. Valves 506*a*, 506*b* may be provided in the apparatus 500 such that an air flow between the chamber 502 and the surrounding environment 507 can be achieved and also controlled. To control the apparatus 500, a control unit 508 may be provided. This control unit 508 may for instance be configured to switch between the different stages of heating, drying and cooling, but also receive measurement data continuously and adapt various operational settings accordingly.

The hot water 212 may be supplied via a hot water supply pipe 510 feeding into the apparatus, and in a similar manner the cold water 214 may be supplied via a cold water supply pipe 512.

Optionally, to provide for that the package 200 can be dried efficiently inside the chamber 502, an air circulation system 514 may be used. As illustrated, this may be connected to the apparatus 500 via the valves 506*a*. The air circulation system 514 can comprise a condenser 516, arranged to release water from the air that is circulated from the chamber 502, and a fan 518, arranged to provide a movement of the air through the air circulation system 514. Alternatively, humid air in the chamber 502 may be vented out while letting in more dry air from the surrounding environment.

To be able to release water from the apparatus 500, an outlet 520 may be provided.

During the step of drying 404, an air flow AF can be generated to provide for that steam is removed from the chamber 502 such that humidity in the chamber is reduced.

As exemplified by the condenser 516, the step of drying 404 may comprise condensing water from air to provide for reduced humidity in the chamber 502.

Figure 6:
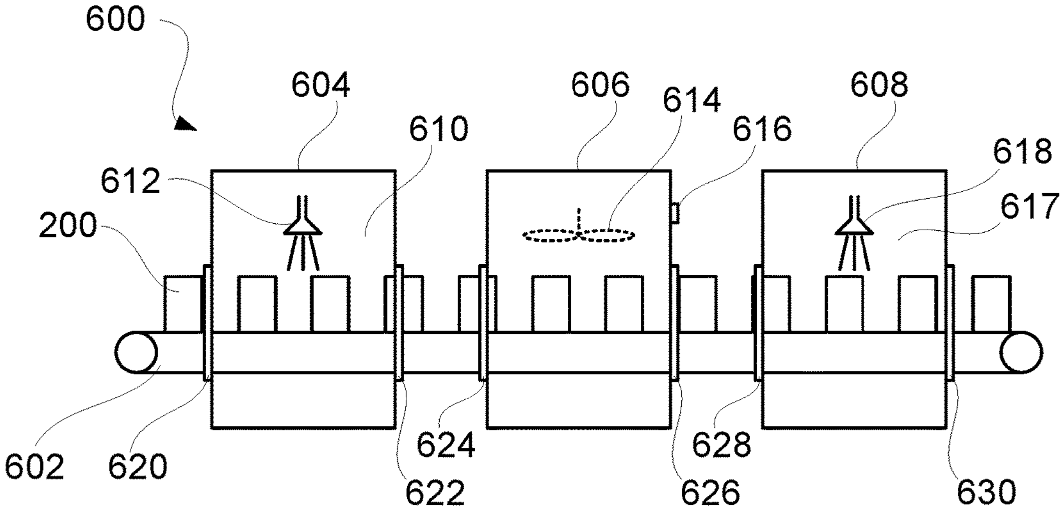
FIG. 6 illustrates a system for continuous heat treating of food product in packages.

FIG. 6 illustrates a system 600 for heat treating food products 201 contained in the packages 200. Unlike the apparatus 500 illustrated in FIG. 5, the system 600 is an example of continuous heat treatment of food products 201 contained in packages 200.

In this particular example, the packages 200 can be transported on a conveyor band 602 through a heating station 604, a drying station 606 and a cooling station 608. The heating station 604 can comprise a chamber 610 and a nozzle 612 for providing the hot water 212 such that the food product 201 can be heated, thereby assuring that bacteria and other unwanted microorganisms are killed off. The drying station 606 can be provided with a fan 614 to provide for air circulation. A valve 616 can be provided for allowing moist air to be released from the drying station 606. The cooling station 608 can be provided with a chamber 617 and a nozzle 618 for providing the hot water 214. Even though not illustrated, the system 600 may comprise an air circulation system as illustrated in FIG. 5.

The different stations may be provided with gates for controlling that humidity and temperature can be retained inside the different stations. The gates can be mechanical and/or air controlled, i.e. the air flow can be controlled such that surrounding air is not let in and the air held inside is not let out. The heating station 602 can have an incoming gate 620 and an outgoing gate 622. The drying station 606 can have an incoming gate 624 and an outgoing gate 626. The cooling station 608 can have an incoming gate 628 and an outgoing gate 630.

From the description above follows that, although various embodiments of the invention have been described and shown, the invention is not restricted thereto, but may also be embodied in other ways within the scope of the subject-matter defined in the following claims.

The invention claimed is:

1. A method for heat treating a food product contained in a package, the package being made of a packaging material comprising a carton layer, said method comprising, in consecutive order exposing the package to hot water to thereby transfer heat from the hot water to the food product, drying the package at a temperature below 20 °C, such that a water content in the carton layer of the packaging material is reduced, and exposing the package to cold water to thereby transfer heat from the food product to the cold water.

2. The method according to claim 1, wherein the package is exposed to the hot water until a temperature of the food product is in the range of 90 to 130° C.

3. The method according to claim 1, wherein the package is exposed to the hot water for 15 to 80 minutes.

4. The method according to claim 1, wherein the exposing of the package to hot water comprises holding the package in a chamber having a relative humidity in the range of 80 to 100%.

5. The method according to claim 1, wherein the drying is performed for at least 1 minute.

6. The method according to claim 1, wherein the drying comprises holding the package in a chamber having an absolute humidity that is less than half of the absolute humidity of the chamber when the package is exposed to the hot water.

7. The method according to claim 1, wherein the drying comprises holding the package in a relative humidity that is less than 30%.

8. The method according to claim 1, wherein the drying comprises holding the package in a relative humidity that is less than 50% or the relative humidity of the chamber when the package is exposed to hot water.

9. The method according to claim 1, wherein the package is exposed to the cold water until a temperature of the food product is gradually reduced to less than 50° C.

10. The method according to claim 1, wherein the food product is exposed to the cold water for 20 to 90 minutes.

11. The method according to claim 1, wherein the exposing of the package to cold water comprises holding the package in a relative humidity in the range of 80 to 100%.

12. The method according to claim 1, wherein the step of drying comprises generating an air flow in a chamber holding the package, to provide for that steam is removed from said chamber such that humidity in said chamber is reduced.

13. The method according to claim 1, wherein the step of drying comprises condensing water from air in a chamber holding the package, to provide for reduced humidity in said chamber.

14. A food product contained in a food package obtained by the method according to claim 1.

15. An apparatus for heat treating a food product contained in a package, the package being made of a packaging material comprising a carton layer, said apparatus comprising a chamber arranged to hold the food package, a nozzle arrangement arranged to provide hot water inside the chamber for exposing the package to hot water and thereby transfer heat from the hot water to the food product, and provide cold water inside the chamber for exposing the package to cold water to thereby transfer heat from the food product to the cold water, and an air circulation system for circulating air in the chamber and comprising a condenser for reducing the humidity of the air and thereby provide for drying the package at a temperature below 20 °C, prior to the exposure of cold water and when located inside the chamber, such that a water content in the carton layer of the packaging material is reduced.

16. A system for heat treating a food product contained in a package, the package being made of a packaging material comprising a carton layer, said system comprising, in sequential order a heating station provided with a chamber arranged to expose the package to hot water to thereby transfer heat from the hot water to the food product, a drying station arranged to dry the package at a temperature below 20 °C, such that a water content in the carton layer of the packaging material is reduced, and a cooling station provided with a chamber arranged to expose the package to cold water to thereby transfer heat from the food product to the cold water.

* * * * *